US009058814B2

(12) United States Patent
Pratt et al.

(10) Patent No.: US 9,058,814 B2
(45) Date of Patent: Jun. 16, 2015

(54) MOBILE DEVICES, METHODS, AND COMPUTER PROGRAM PRODUCTS FOR ENHANCING SOCIAL INTERACTIONS WITH RELEVANT SOCIAL NETWORKING INFORMATION

(75) Inventors: James Pratt, Round Rock, TX (US);
Steven Belz, Cedar Park, TX (US);
Marc Sullivan, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1173 days.

(21) Appl. No.: 12/946,208

(22) Filed: Nov. 15, 2010

(65) Prior Publication Data
US 2012/0123779 A1 May 17, 2012

(51) Int. Cl.
*G10L 15/26* (2006.01)
*G10L 15/08* (2006.01)

(52) U.S. Cl.
CPC ........... *G10L 15/26* (2013.01); *G10L 2015/088* (2013.01)

(58) Field of Classification Search
CPC ................................. G10L 15/00; H04M 3/42
USPC ........................................................ 704/270
See application file for complete search history.

(56) References Cited

U.S. PATENT DOCUMENTS

| 6,654,735 | B1 * | 11/2003 | Eichstaedt et al. ............ 707/749 |
| 7,400,711 | B1 * | 7/2008 | Ford et al. ....................... 379/70 |
| 7,818,176 | B2 * | 10/2010 | Freeman et al. ............... 704/270 |
| 2002/0194061 | A1 * | 12/2002 | Himmel et al. .................. 705/14 |
| 2003/0097250 | A1 * | 5/2003 | Chino ................................. 704/1 |
| 2004/0008828 | A1 * | 1/2004 | Coles et al. ................. 379/88.01 |
| 2004/0181517 | A1 | 9/2004 | Jung et al. |
| 2005/0216269 | A1 * | 9/2005 | Scahill et al. ............... 704/270.1 |
| 2005/0283365 | A1 * | 12/2005 | Mizutani et al. .............. 704/257 |
| 2007/0116227 | A1 * | 5/2007 | Vitenson et al. ......... 379/207.02 |
| 2007/0174258 | A1 * | 7/2007 | Jones et al. ........................ 707/3 |
| 2008/0086261 | A1 | 4/2008 | Robinson et al. |
| 2008/0115163 | A1 * | 5/2008 | Gilboa et al. .................... 725/34 |
| 2008/0183706 | A1 * | 7/2008 | Dong ............................... 707/6 |
| 2009/0210228 | A1 * | 8/2009 | George .......................... 704/251 |
| 2009/0271244 | A1 | 10/2009 | Kalasapur et al. |
| 2009/0287682 | A1 * | 11/2009 | Fujioka et al. .................... 707/5 |
| 2009/0290689 | A1 * | 11/2009 | Watanabe et al. .......... 379/88.01 |
| 2009/0306981 | A1 * | 12/2009 | Cromack et al. ............. 704/235 |
| 2009/0327263 | A1 * | 12/2009 | Maghoul ............................ 707/5 |
| 2010/0138224 | A1 * | 6/2010 | Bedingfield, Sr. ............ 704/275 |
| 2010/0169091 | A1 * | 7/2010 | Zurek et al. .................. 704/235 |
| 2010/0257023 | A1 * | 10/2010 | Kendall et al. .................. 705/10 |
| 2010/0299140 | A1 * | 11/2010 | Witbrock et al. ................. 704/9 |
| 2012/0065969 | A1 * | 3/2012 | DeLuca et al. ............... 704/235 |

* cited by examiner

*Primary Examiner* — Jialong He

(74) *Attorney, Agent, or Firm* — Parks Wood LLC

(57) ABSTRACT

Devices, methods, and computer program products are for facilitating enhanced social interactions using a mobile device. A method for facilitating an enhanced social interaction using a mobile device includes receiving an audio input at the mobile device, determining a salient portion of the audio input, receiving relevant information associated with the salient portion, and presenting the relevant information via the mobile device.

15 Claims, 6 Drawing Sheets

MOBILE DEVICES, METHODS, AND COMPUTER PROGRAM PRODUCTS FOR ENHANCING SOCIAL INTERACTIONS WITH RELEVANT SOCIAL NETWORKING INFORMATION

TECHNICAL FIELD

The embodiments presented herein relate generally to social networking and, more particularly, to mobile devices, methods, and computer program products for enhancing social interactions with relevant social networking information.

BACKGROUND

Computer-based social networking has garnered considerable interest from individuals, organizations, and businesses desiring the ability to network, share data, and generally keep-in-touch with others. Many mobile devices such as smart phones have the ability to access mobile versions and, in some instances, full versions of social networking websites. Some of these devices support native applications that permit nearly full-featured access to social networking platforms.

Some in-person social encounters, such as meetings, parties, chance encounters, and other events in which individuals come together for one reason or another, can lead to opportunities of uncomfortable moments in which an individual engaged in a conversation or intending to engage in a conversation could benefit from information about the person with whom they are conversing or intending to converse to facilitate further conversation or initiate new conversation.

SUMMARY

According to one aspect disclosed herein, a method for facilitating an enhanced social interaction using a mobile device includes receiving an audio input at the mobile device, determining a salient portion of the audio input, receiving relevant information associated with the salient portion, and presenting the relevant information via the mobile device to a user of the mobile device.

In one embodiment, the method further comprises receiving an identifier at the mobile device. The identifier identifies an individual associated with the audio input. In one embodiment, receiving the audio input at the mobile device includes receiving, via a microphone of the mobile device, the audio input from the individual, the individual being located within a range of the microphone. In another embodiment, receiving the audio input at the mobile device includes receiving, via a microphone of the mobile device, the audio input from the individual, the individual being engaged in a vocal conversation with a user of the mobile device. In another embodiment, receiving the audio input at the mobile device includes receiving, via a transceiver of the mobile device, an audio file including the audio input, the audio input being associated with the individual, the individual being engaged in a vocal conversation with a user of the mobile device. In another embodiment, receiving the audio input at the mobile device includes receiving, via a transceiver of the mobile device, an audio file comprising the audio input, the audio input being associated with the individual, the individual being someone with whom a user of the mobile device expects to be engaged in a vocal conversation. In another embodiment, receiving the audio input at the mobile device includes receiving, via a transceiver of the mobile device, an audio file comprising the audio input, the audio input being associated with the individual, the individual being located within a pre-defined distance of the mobile device.

In one embodiment, determining the salient portion of the audio input includes converting at least a portion of the audio input into text and identifying at least one keyword from the text, the at least one keyword being the salient portion. In another embodiment, analyzing at least a portion of the audio input and identifying at least one keyword from the audio input, the at least one keyword being the salient portion.

In one embodiment, the method also includes comparing the salient portion of the audio input to social networking information to determine the relevant information. In one embodiment, comparing the salient portion of the audio input to the social networking information includes comparing the salient portion of the audio input to social networking information associated with the individual, and the social networking information is retrieved from a data store associated with a social network. The social networking information may include, for example, at least one of a name, a physical address, a telephone number, an email address, a chat client handle, a user name, an avatar, a profile, a profile picture, a post by the individual, a topic of interest to the individual, and a specific detail about a topic of interest to the individual.

In one embodiment, presenting the relevant information includes presenting the relevant information via at least one of a display and an audio output of the mobile device, the audio output includes at least one of a speaker, an audio output jack to which a wired audio output device is connected, and a wireless audio output component to which a wireless audio output device is connected.

According to another aspect, a non-transitory computer-readable medium includes computer-executable instructions that, when executed by a processor, cause the processor to perform steps of the aforementioned method.

According to another aspect, a mobile device for facilitating an enhanced social interaction includes at least one of a display and an audio output, a processor, and a memory operatively coupled to the processor. The memory includes instructions that, when executed by the processor, cause the processor to perform steps of the aforementioned method.

DETAILED DESCRIPTION

As required, detailed embodiments are disclosed herein. It must be understood that the disclosed embodiments are merely exemplary examples that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials, or methods have not been described in detail in order to avoid obscuring the embodiments disclosed herein. Therefore, specific structural and functional details disclosed herein are not to be interpreted as limiting, but merely as a basis for the claims and as a representative basis for teaching one skilled in the art to variously employ the disclosed embodiments.

Figure 1:
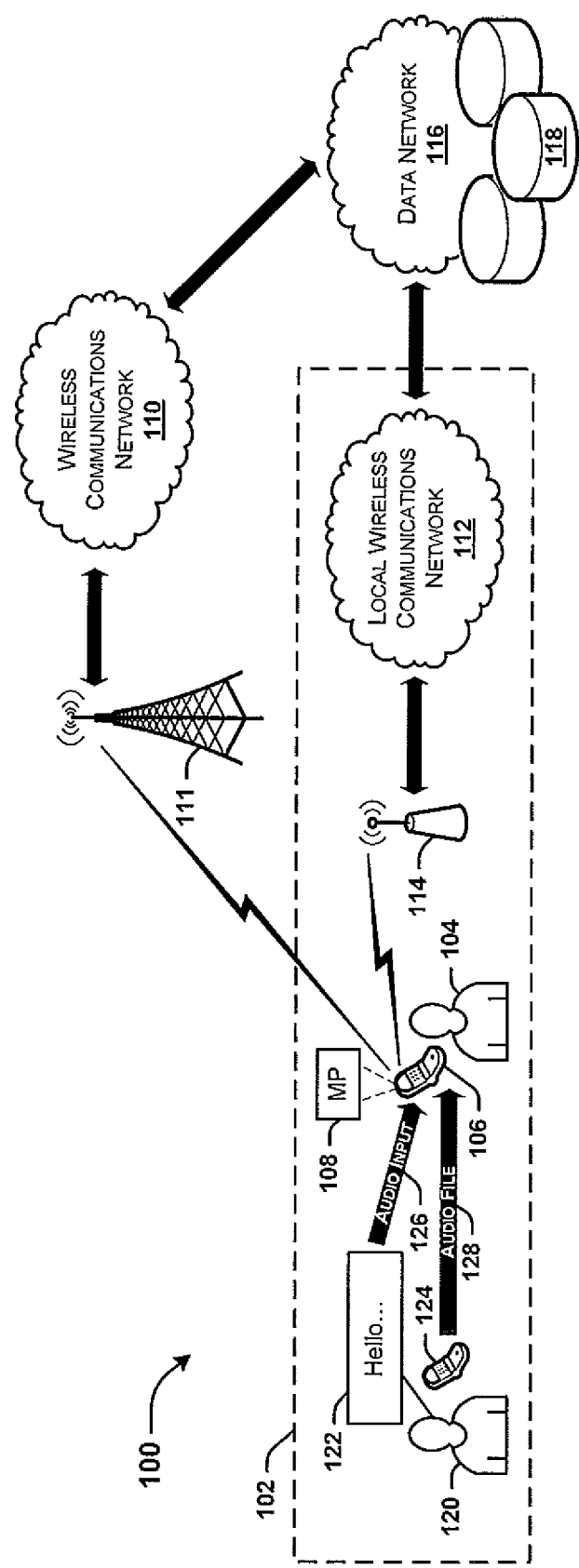
FIG. 1 schematically illustrates an exemplary environment in which various embodiments disclosed herein may be implemented.

Referring now to the drawings wherein like numerals represent like elements throughout the several figures, FIG. 1 schematically illustrates an exemplary environment 100 in which various embodiments disclosed herein may be implemented. The environment 100 includes premises 102 in which a first user 104 is located. The premises 102 may be inside or outside of a building or other structure, in a park or other outdoor setting, or any other location. The first user 104 is associated with a first mobile device (MD) 106 that includes a microphone 108. The first MD 106 may be a cellular telephone, a computer (e.g., a tablet computer or a notebook computer), a media playback device (e.g., a portable music player, a portable recorder, or a portable video player), a handheld video game console, combinations thereof, or the like. The first MD 106, in some embodiments, is configured to access a wireless communications network 110 via a radio access network (RAN) 111. The wireless communications network 110 may operate using telecommunications standards such as Global System for Mobile communications (GSM) and a Universal Mobile Telecommunications System (UMTS). The wireless communications network 110 may alternatively or additionally use any existing, developing, or yet to be developed telecommunications technologies. Some examples of other suitable telecommunications technologies include, but are not limited to, networks utilizing Time Division Multiple Access (TDMA), Frequency Division Multiple Access (FDMA), Wideband Code Division Multiple Access (WCDMA), CDMA2000, Orthogonal Frequency Division Multiplexing (OFDM), Long Term Evolution (LTE), and various other 2G, 2.5G, 3G, 4G, and greater generation technologies. Examples of suitable data bearers include, but are not limited to, General Packet Radio Service (GPRS), Enhanced Data rates for Global Evolution (EDGE), the High-Speed Packet Access (HSPA) protocol family such as High-Speed Downlink Packet Access (HSDPA), Enhanced Uplink (EUL) or otherwise termed High-Speed Uplink Packet Access (HSUPA), Evolved HSPA (HSPA+), WiMAX™, and various other current and future data bearers.

The first MD 106, in another embodiment, is additionally or alternatively configured to access a local wireless communications network 112 serving the premises 102 via one or more access points 114, such as an IEEE 802.11-compliant Wi-Fi™ access point or a femtocell node-B. The wireless communications network 110 and the local wireless communications network 112 are each in communication with a data network 116, such as the Internet or an intranet. One or more data stores 118 are accessible via the data network 116. The data store(s) 118 may be embodied as a database accessible by one or more servers (not shown) associated with, for example, a social networking platform to which a second user 120 is associated. For example, the second user 120 may be a member, a registered user, a trial user, or a user in some capacity of the social networking platform.

The data store(s) 118 is configured to store information associated with the second user 120 who is a user of a social networking platform associated with the data store(s) 118. As used herein, the term "social network" refers broadly to a social structure of individuals, businesses, organizations, and/or other entities connected by one or more types of interdependency, such as friendship, kinship, common interest, financial exchange, dislike, romantic relationship, religious beliefs, knowledge, education, prestige, or other relationship. Moreover, the social network may include one or more social network platforms by which members of the social network can interact. Exemplary social network platforms include, for example, Facebook™, Twitter™, LinkedIn™, MySpace™, Foursquare™, and the like. The social network platforms may be interconnected so as to share information upon user opt-in. The second user 120 may set privacy settings to regulate who is privy to information stored in the data store(s) 118 in association with the second user 120.

The social network, in one embodiment, facilitates social introduction, social networking, professional networking, and/or dating services. For example, the social network may provide social services and information for purposes of personal development, such as self-improvement, self-fulfillment, charitable, philanthropic, volunteer, public services, community services, and humanitarian activities. By further example, the social network may provide professional services and information for purposes of professional development, such as education, training, and practice development.

In one embodiment, the social network is a computer service such as an on-line virtual community for members to organize groups and events, participate in discussions, and/or engage in social, business, and community networking. In another embodiment, the social network is a computer service for hosting electronic facilities for others to organize and conducts meetings, events, and interactive discussions via communication networks such as the wireless communications network 110, the local wireless communications network 112, and/or the data network 116.

In another embodiment, the social network is provided by an application service provider (ASP) that hosts computer software applications of its own or others. In one embodiment, the ASP provides software that is accessible via, for example, a web application or website, a mobile device application, a computer application, or other device application that is configured to enable or facilitate the uploading, downloading, streaming, posting, displaying, blogging, linking, sharing or otherwise providing of electronic media or information over communication networks such as the wireless communications network 110, the local wireless communications network 112, and/or the data network 116.

In yet another embodiment, the social network provides an online network service that enables users to transfer personal identity data to and share personal identity data with and among multiple websites.

In still another embodiment, the social network enables users to create personal profiles featuring social networking information and to transfer and share such information among multiple websites.

In another embodiment, the social network creates indexes of information, sites, and/or other resources available on computer networks, provides temporary use of non-downloadable software applications for social networking, creates a virtual community, and/or facilitates the transmission of audio, video, photographic images, text, graphics, and/or data.

In another embodiment, the social network provides computer services in the nature of customized web pages featuring user-defined or specified information such as personal profiles, audio, video, photographic images, text, graphics, and/or data.

In another embodiment, the social network facilitates peer-to-browser photo sharing services, such as providing a website featuring technology enabling users to upload, view, and download digital photos.

In another embodiment, the social network provides computer services for providing a web site featuring technology that enables users to upload and share video, photos, text, graphics, and/or data.

In another embodiment, the social network provides computer services for creating and maintaining blogs.

In another embodiment, the social network provides a web hosting platform for use of non-downloadable software in connection with interactive, multiplayer, and/or single player games.

In another embodiment, the social network provides a platform for social multiplayer gaming in which users can interact via text, voice, and/or virtual interaction between virtual characters, machines, or objects before, during, or after a game experience.

Referring again to the illustrated premises 102, the second user 120 is illustrated as being engaged in a conversation 122. The conversation 122 may be between the first user 104 and the second user 120; the first user 104, the second user 120, and one or more other users (not shown); the second user 120 and one or more other users (not shown); the second user 120 and himself/herself; or the second user 120 and one or more other users via a second MD 124, which may be embodied like the first MD 106, as described above.

In any case, in one embodiment, the microphone 108 of the first MD 106 is configured to receive, as input, audio 126 generated from the conversation 122. In one embodiment, the first user 104 via the microphone 108 of the first MD 106 is able to ascertain a position of the second user 120 using audio localization techniques known to those skilled in the art. As such, the microphone 108 may be configured as a directional or non-directional microphone with sensitivity characteristics designed, at least in part, for such techniques.

Information regarding the second user 120 that is potentially relevant to the first user 104 is presented to the first user 104 based upon an analysis of an audio input (e.g., the audio input 126 or the audio file 128) and social networking information associated with the second user 120, as described in greater detail herein. If the audio input 126 includes voice audio of the second user 120, the first MD 104 may identify the second user 120 using voice recognition analysis of the voice audio, for example, by comparing the voice audio to a voice print of the second user 120 retrieved at some point from one of the second user 120, the second MD 124, or the data store(s) 108. Other methods for determining the identity of the second user 120 include short-range communications between the first MD 106 and the second MD 124 to exchange identity information, as is described in greater detail below with reference to FIG. 3.

In another embodiment, an audio file 128 is received via a transceiver (illustrated in FIG. 2) of the first MD 106. The audio file 128, in the illustrated embodiment, is received directly from the second MD 124 via a short-range peer-to-peer connection established via short-range communications such as Bluetooth™, near-field communications (NFC), infrared, infrared data association (IrDA), other unlicensed short-range radio frequencies, and the like. In another embodiment, the audio file 128 is received via the local wireless communications network 112. For example, the audio file 128 may be shared by the second user 120 with the first user 104 such as by an ad-hoc Wi-Fi™ network between the first MD 106 and the second MD 124, a server (not shown) of the local wireless communications network 112, one of the data stores 118 of the data network 116 accessed via the local wireless communications network 112, or one of the data stores 118 of the data network 116 accessed via the wireless communications network 110. In any case, the audio file 128 may include at least a portion of a present conversation (e.g., the illustrated conversation 122) or a previous interaction between the first user 104 and the second user 120.

The audio file 128 may be formatted in an open or proprietary file format such as way, ogg, mpc, flat, aiff, raw, au, dot, vox, mmf, mp3, aac, mp4/m4a, wma, ra & rm, dss, msv, dvf, IVS, m4p, 3gp, amr, or awb. The first MD 106 may download (e.g., all at once or progressive) or stream the audio file 128 from the second MD 124.

Exemplary Mobile Device

Figure 2:
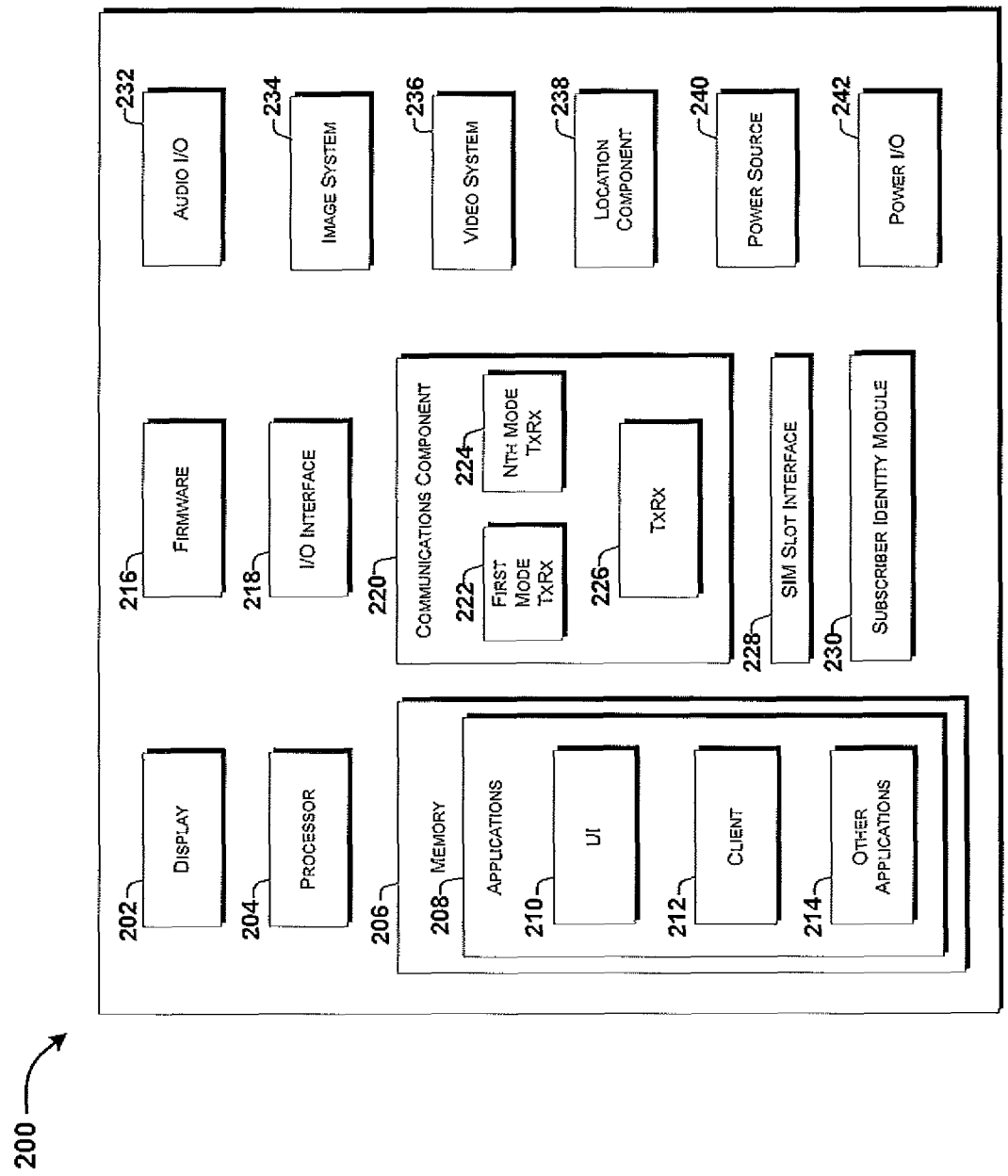
FIG. 2 schematically illustrates a mobile device and components thereof, according to one embodiment disclosed herein.

Referring now to FIG. 2, a schematic block diagram of an exemplary mobile device (MD) 200 and components thereof is illustrated. Although connections are not shown between the components illustrated in FIG. 2, the components can interact with each other to carry out device functions. In some embodiments, for example, the components are arranged so as to communicate via one or more busses (not shown). It should be understood that FIG. 2 and the following description are intended to provide a general understanding of a suitable environment in which various aspects of the disclosed embodiments can be implemented.

In some embodiments, the first MD 106 illustrated in FIG. 1 is configured like the illustrated MD 200, now described. In some embodiments, the MD 200 is a multimode headset configured to provide access to more than one network type such as the wireless communications network 110 and the local wireless communications network 112.

In some embodiments, the MD 200 includes computer-readable media, including, for example, volatile media, non-volatile media, removable media, and non-removable media. The term "computer-readable media" and variants thereof, as used herein with respect to the MD 200, refer to storage media and communication media. In some embodiments, storage media includes volatile and/or non-volatile, removable, and/or non-removable media. For example, storage media includes random access memory (RAM), read-only memory (ROM), electrically erasable programmable read-only memory (EEPROM), solid state memory or other memory technology, CD-ROM, DVD, or other optical disk-based storage, magnetic tape, magnetic disk storage or other magnetic storage devices, or any other tangible, non-transitory medium that can be used to store the desired information and that can be accessed by the MD 200.

As illustrated in FIG. 2, the MD 200 includes a display 202 for presenting multimedia such as, for example, short messaging system (SMS) messages, enhanced messaging service (EMS), multimedia messaging service (MMS) messages, customer service messages, over-the-air (OTA) messages, unstructured supplementary service data (USSD) messages, voicemail notification messages, application graphical user interfaces (GUIs), text, images, video, telephony functions, such as Caller ID data, setup functions, menus, music, metadata, wallpaper, graphics, Internet content, multicast content, broadcast content, social networking content, game content, device status, preferences settings, map and location data, search information, profile (e.g., vibrate, silent, loud) selection, and the like. In one embodiment, the display 202 is configured to present relevant information of the second user 120, as described in greater detail below.

The illustrated MD 200 also includes a processor 204 for processing data and/or executing computer-executable instructions of one or more applications 208 stored in a memory 206. In some embodiments, the application(s) 206 include a user interface (UI) application 210. The UI application 210 interfaces with a client 212 (e.g., an operating system (OS)) to facilitate user interaction with device functionality and data. In some embodiments, the client 212 is one of Symbian OS® (Symbian OS is a registered trademark of Symbian Limited, of London, England), Microsoft® Windows® Mobile OS (Microsoft and Windows are registered trademarks of the Microsoft Corporation of Redmond, Wash.), Microsoft® Windows® Phone OS, Palm webOS® (Palm WebOS is a registered trademark of the Palm Trademark Holding Company, of Sunnyvale, Calif.), Palm OS® (also a registered trademark of the Palm Trademark Holding Company), RIM® BlackBerry® OS (RIM and Blackberry are registered trademarks of Research In Motion Limited of Waterloo, Ontario, Canada), Apple® iOS (Apple and iPhone are registered trademarks of the Apple Corporation, of Cupertino, Calif.), or Google Android® OS (Android is a registered trademark of Google, Inc., of Mountain View, Calif.). These operating systems are merely exemplary of the operating systems that can be used in accordance with the embodiments disclosed herein. Other operating systems or versions of the aforementioned operating systems are contemplated.

The UI application 210 aids a user in activating service OTA, if applicable, entering message content, viewing received messages (e.g., MMS messages, SMS messages, USSD messages, OTA messages), answering/initiating calls, entering/deleting data, entering and setting user IDs and passwords for device access, configuring settings, manipulating address book content and/or settings, multimode interaction, interacting with other applications 214, and the like.

In one embodiment, the other applications 214 include an application that when executed by the processor 204 causes the processor 204 to perform one or more steps of the methods described herein below with reference to FIGS. 3-6. In some embodiments, the other applications 214 include, for example, visual voicemail applications, messaging applications (e.g., SMS, EMS, and MMS applications), presence applications, text-to-speech applications, speech-to-text applications, add-ons, plug-ins, email applications, music applications, video applications, camera applications, location service applications (LSAs), power conservation applications, game applications, productivity applications, entertainment applications, enterprise applications, combinations thereof, and the like. The applications 208 are stored in the memory 206 and/or as a firmware 216, and are executed by the processor 204. The firmware 216 may also store code for execution during device power up and power down operations.

The MD 200 also includes an input/output (I/O) interface 218 for input/output of data such as location information, presence status information, user IDs, passwords, and application initiation (start-up) requests. In some embodiments, the I/O interface 218 is a hardwire connection such as a USB, mini-USB, audio jack, PS2, IEEE 1394, serial, parallel, Ethernet (RJ48) port, RJ11 port, HDMI port, mini-HDMI, and the like. In some embodiments, the I/O interface 218 is a proprietary interface. In some embodiments, the I/O interface 218 accepts other I/O devices such as keyboards, keypads, mice, interface tethers, stylus pens, printers, solid state memory drives, touch screens, multi-touch screens, touch pads, trackballs, joysticks, directional pads, analog control sticks, microphones (e.g., the microphone 108), remote control devices, monitors, displays (e.g., liquid crystal displays (LCDs), light emitting diode (LED) backlight LCD, and organic LED (OLED)) combinations thereof, and the like. It should be appreciated that the I/O interface 218 may be used for communications between the MD 200 and a network device or local device, instead of, or in addition to, a communications component 220.

The communications component 220 interfaces with the processor 104 to facilitate wired/wireless communications with external systems. Example external systems include, but are not limited to, SMS service centers (SMSCs), intranets, network databases, network storage systems, cellular networks (e.g., the wireless communications network 110), location servers, presence servers, VoIP networks, local area networks (LANs), wide area networks (WANs), metropolitan area networks (MANS), personal area networks (PANs), and other networks, network components, and systems described herein. In some embodiments, the external systems are implemented using Wi-Fi™, WiMAX™, combinations and/or improvements thereof, and the like. In some embodiments, the communications component 220 includes a multimode communications subsystem for providing cellular communications via different cellular technologies. In some embodiments, for example, a first cellular transceiver 222 operates in one mode, such as, GSM, and an Nth cellular transceiver 224 operates in a different mode, such as UMTS or LTE. While only two cellular transceivers 222, 224 are illustrated, it should be appreciated that a plurality of transceivers can be included. Moreover, a portion of or the entirety of the communications component 220 may be provided as an add-on to the MD 200. The add-on may attach or wirelessly communicate with the MD 200 via the I/O interface 218 using a standardized or proprietary communication specification.

The illustrated communications component 220 also includes an alternative communications transceiver 226 for use by other communications technologies such as, for example, Wi-Fi™, Wi-Max™ Bluetooth™, near-field communications (NFC), infrared, infrared data association (IrDA), other unlicensed short-range radio frequencies, and the like. In some embodiments, the communications component 220 also facilitates reception from terrestrial radio networks, digital satellite radio networks, Internet-based radio services networks, combinations thereof, and the like.

The MD 200 also includes a SIM slot interface 228 for accommodating a SIM 230 such as a SIM card, a universal SIM (USIM) card, or a universal integrated circuit card (UICC) including one or more SIM applications (e.g., ISIM, SIM, USIM, CSIM).

Audio capabilities for the MD 200 may be provided by an audio I/O component 232 that includes a speaker for the output of audio signals and a microphone (e.g., the microphone 108) to collect audio signals such as the audio input 126, illustrated in FIG. 1. The microphone may be internal or external to the MD 200, the latter of which may be in wired or wireless communication with the MD 200 via, for example, the I/O interface 218 or the alternative communications transceiver 226. Moreover, the microphone may be configured with directionality and sensitivity characteristics to facilitate capture of the audio input 126 in varying environments. These characteristics may be configured via hardware and/or software by the manufacturer of the microphone, the first user 104, or a third party. For example the microphone may be a directional or non-directional microphone and may include one or more sensors. Various types of microphones such as microelectromechanical systems (MEMs) microphones, fiber optic microphones, laser microphones, piezoelectric microphones, and the like, are contemplated.

In some embodiments, the microphone is an ear piece that the first user 104 can wear. In these embodiments, the ear piece microphone may be in wired or wireless communication with the MD 200. Other wearable embodiments are contemplated such as incorporation of the microphone into a piece of jewelry, an article of clothing, or an accessory. In other embodiments, the microphone is embedded under the skin, in the ear, or elsewhere on the body of the first user 104. The microphone may also be attached to the skin using an adhesive tape, glue, or some other bonding material.

The MD 200 may also include an image capture and processing system 234 (image system). Photos may be obtained via an associated image capture subsystem of the image system 234, for example, a charge-coupled device (CCD) or active pixel sensor (APS) camera. The MD 200 may also include a video system 236 for capturing, processing, recording, modifying, and/or transmitting video content. Photos and videos obtained using the image system 234 and the video system 236, respectively, may be added as message content to an MMS message and sent to another mobile device.

The MD 200 also includes a location component 238 for sending and/or receiving signals such as, for example, GPS data, assisted GPS (A-GPS) data, Wi-Fi™/Wi-Max™, and/or cellular network triangulation data, combinations thereof, and the like, for determining a location of the MD 200. The location component 238 may communicate with the communications component 220 to retrieve triangulation data for determining a location. In some embodiments, the location component 238 interfaces with cellular network nodes, telephone lines, satellites, location transmitters and/or beacons, wireless network transmitters and receivers, for example, Wi-Fi™ hotspots, short-range radio transmitters, combinations thereof, and the like. Using the location component 238, the MD 200 obtains, generates, and/or receives data to identify its location, or transmits data used by other devices to determine the location of the MD 200.

The MD 200 also includes a power source 240, such as batteries and/or other power subsystem (AC or DC). The power source 240 may interface with an external power system or charging equipment via a power I/O component 242.

Exemplary Methods

While the processes or methods described herein may, at times, be described in a general context of computer-executable instructions, the present methods, procedures, and processes can also be implemented in combination with other program modules and/or as a combination of hardware and software. The term application, or variants thereof, is used expansively herein to include routines, program modules, programs, components, data structures, algorithms, and the like. Applications can be implemented on various system configurations, including servers, network nodes, single or multiple processor computers, hand-held computing devices, mobile communications devices, microprocessor-based consumer electronics, programmable electronics, network elements, gateways, network functions, devices, combinations thereof, and the like. In particular, the following methods may be executed, at least in part, by the first MD 106 which, in one embodiment, is configured like the MD 200, as described above. Other embodiments are contemplated in which the MD 200 shares execution tasks with one or more servers (not shown) and/or the second MD 124.

It should be understood that the steps of the following methods are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated methods can be ended at any time. In certain embodiments, some or all steps of these methods, and/or substantially equivalent steps can be performed by execution of computer-readable instructions stored or included on a non-transitory computer-readable medium.

Figure 3:
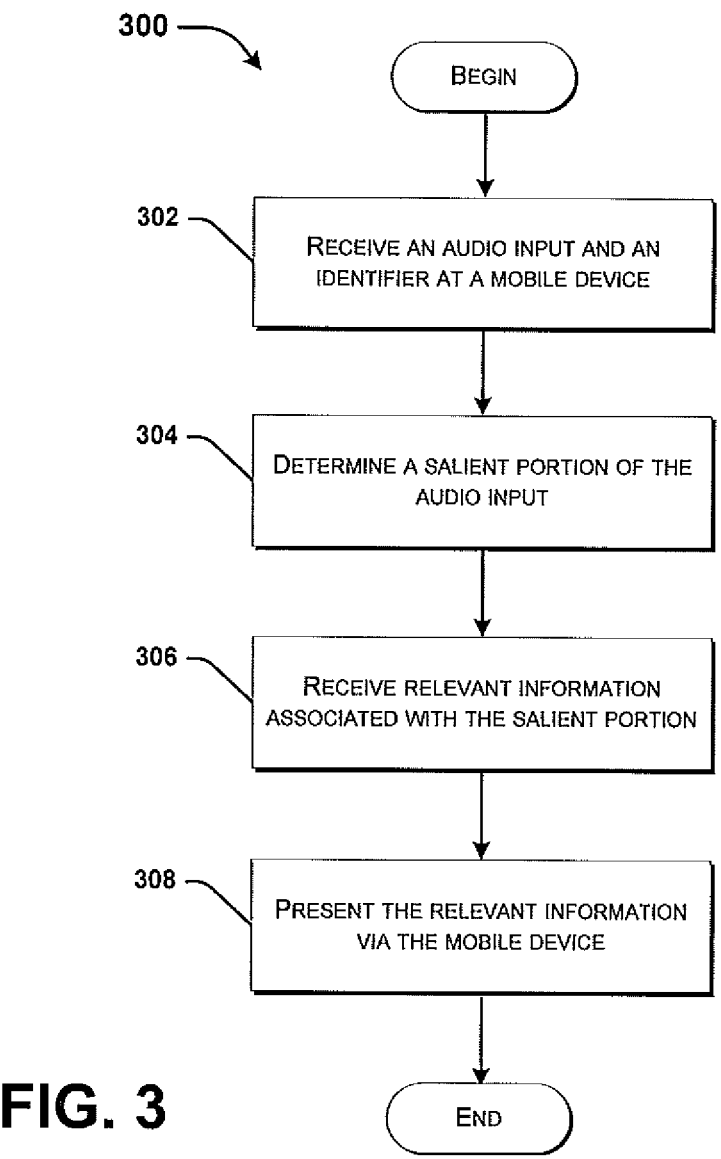
FIG. 3 illustrates a method for facilitating an enhanced social interaction via a mobile device, according to one embodiment disclosed herein.

Turning now to FIG. 3, a method 300 for facilitating an enhanced social interaction using a mobile device such as the first MD 106 is illustrated. The method 300 begins and flow is to block 302, whereat the first MD 106 receives an audio input and an identifier. In one embodiment, the first MD 106 receives the audio input as the audio input 126 via a microphone such as the microphone 108. In another embodiment, the first MD 106 receives the audio input as the audio file 128 via a transceiver such as a transceiver of the communications component 220.

In general, the identifier is used by the first MD 106 to identify the second user 120 so the first MD 106 can access social networking information associated with the second user 120 that is potentially relevant and available (e.g., based upon privacy settings) to the first user 120 for use (e.g., in initiating or progressing a conversation) in a social interaction between the first user 104 and the second user 120. The identifier includes a telephone number, a name, an alias, a user name, or other means for identifying the second user 120. In one embodiment, the first MD 106 receives the identifier via a transceiver such as a transceiver of the communications component 220. For example, the first MD 106 may receive the identifier via the alternative communications transceiver 226 from another device such as the second MD 120 or the data network 116. Alternatively, the first MD 106 may receive the identifier via a cellular transceiver such as one of the cellular transceivers 222, 224. The first MD 106 by similar means may share an identifier associated with the first user 104 with the second MD 124. The second MD 124 may permit or deny further access based upon the identifier of the first user 104.

In one embodiment, the first MD 106 sends a request for the identifier before, during, or after the first MD 106 receives the audio input. The second MD 124, in response to receiving the request, may respond by sending an identifier to the first MD 106 in the same or similar manner in which the second MD 106 received the request. This may be done automatically by the second MD 124 or in response to user input.

The second MD 124 may be configured with privacy settings established by or for the second user 120 to permit or deny a response to the request. The privacy settings, in some embodiments, mirror those established by or for the second user 120 in an account of a social networking platform that is associated with the second user 120. For example, certain individuals may have no access, limited access, or full access to all or portions of the second user's 120 social networking account, and similar access permissions may apply to the first user 104 or other user requesting an identifier from the second MD 124 based upon the individuals access permissions of the second user's 120 social networking account.

At block 304, the first MD 106 determines a salient portion of the audio input, as described in greater detail below with reference to FIGS. 4 and 5. At block 306, the first MD 106 receives relevant information associated with the salient portion of the audio input, as described in greater detail below with reference to FIG. 6. At block 308, the first MD 106 presents the relevant information via a display and/or audio output and the method 300 can end. The relevant information may be presented as audio, video, photographic images, text, graphics, and/or data. The audio output may be at least one of a speaker, an audio output jack to which a wired audio output device is connected, and a wireless audio output component to which a wireless audio output device is connected.

Figure 4:
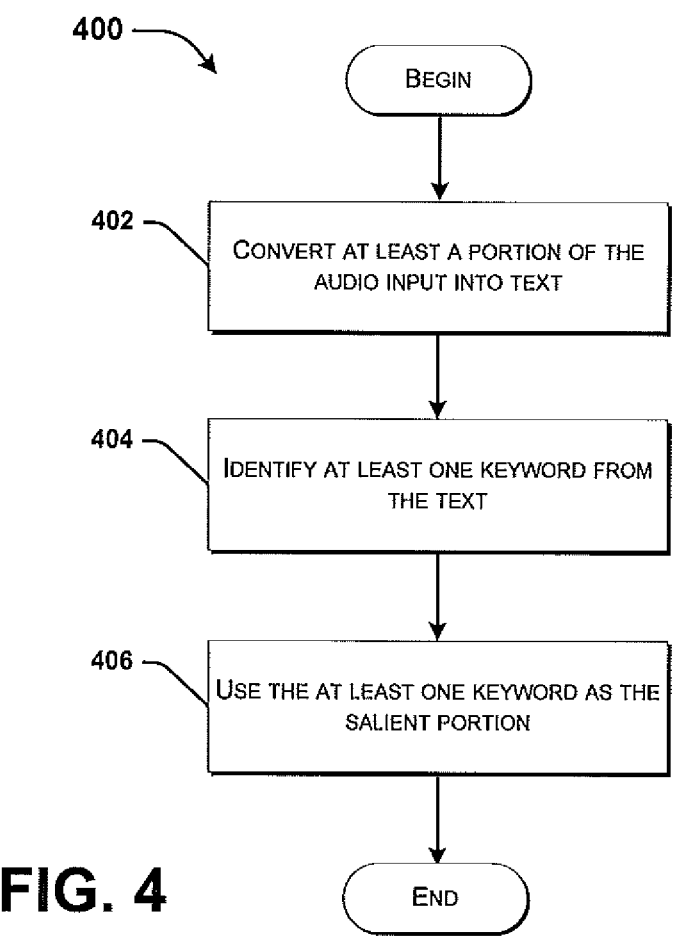
FIG. 4 illustrates a method for determining a salient portion of an audio input, according to one embodiment disclosed herein.

Referring now to FIG. 4, a method 400 for determining a salient portion of an audio input is illustrated, according to one embodiment. The method 400 begins and flow is to block 402, whereat the first MD 106 converts at least a portion of the audio into text using a speech-to-text application of the mobile device, such as the speech-to-text application described above with reference to the other applications 214 of FIG. 2. At block 404, the first MD 106 identifies at least one keyword from the text. At block 406, the first MD 106 uses the keyword as the salient portion. The method 400 can end.

Keywords include words that are considered by the mobile device as being potentially salient to the first user 104 based upon one or more factors such as preferences of the first user 104, preferences of the second user 120, features of a social networking profile of the first user 104, features of a social networking profile of the second user 120, social networking privacy settings of the second user 120, current events, or other topical information for a particular context.

The first user 104 may establish preferences for the types of information he or she considers to be potentially salient or is otherwise interested in as potential conversation subjects. For example, if the first user 104 establishes a preference for common interest as a contributing factor to ascertaining potential salience of a word, the mobile device would consider the common interests of the first user 104, as defined by the first user 104 on the mobile device or as obtained from the data store(s) 118 from social network platform account associated with the first user 104. Any word from the converted audio input that is related to a common interest or other preference of the first user 104 may then be identified (e.g., flagged) as being a keyword for consideration as at least part of the salient portion of the audio input. Likewise, the second user 120 may establish preferences for the types of information he or she considers to be potentially salient. For the second user 120, this information may be information the second user 120 considers, for example, as a potential topic of conversation.

Social networking privacy settings may also contribute to a particular word being identified as a keyword for consideration as at least part of the salient portion of the audio input. The second user 120 may allow all or a portion of interested persons to access his or her social networking information including profile information such as physical address, telephone number, email address, chat client handle, user name, avatar, profile picture, religious beliefs, age, gender, marital status, career, education, and the like, and other information such as posts by the second user 120 on a social networking website, posts by friends, organizations, businesses, or others on second user's 120 space within a social networking website, a topic of interest to the second user 120 (e.g., politics, religion, sports, history, technology, entertainment, etc.), a specific detail about a topic of interest to the second user 120 (e.g., a result of a recent presidential election), or the like. If the first user 104 has not yet established a relationship with the second user 120 via the social networking platform, the first user 104 may not be privy to information that could be used by the mobile device to identify a particular word as being potentially salient. On other hand, if the second user 120 has permitted information to be shared with the first user 104, be it an established relationship or permission granted by the second user 120 for others to access his or her social networking information, the mobile device could identify a particular word as being potentially salient based at least in part upon that information. For example, the second user 120 may share all or a portion of their social networking information and from which the mobile device can infer whether one or more words included in the converted audio input should be considered salient.

Figure 5:
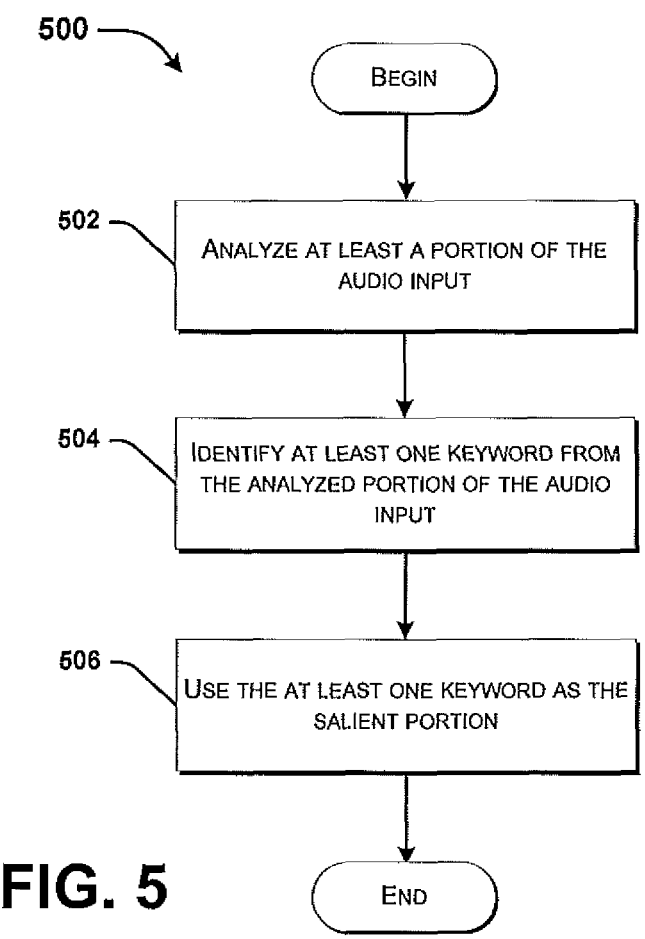
FIG. 5 illustrates a method for determining a salient portion of an audio input, according to another embodiment disclosed herein.

Referring to FIG. 5, a method 500 for determining a salient portion of an audio input is illustrated, according to another embodiment. In one embodiment, the audio input is the audio input 126. In another embodiment, the audio input is the audio file 128. The method 500 begins and flow is to block 502, whereat the mobile device (e.g., the first MD 106) analyzes at least a portion of the audio input. At block 504, based upon the analysis, the first MD 106 identifies at least one keyword from the analyzed portion of the audio input. The keyword may be determined as described above using the audio input as the source data instead of the text (converted audio input) as the source data. At block 506, the first MD 106 uses the at least one keyword as the salient portion. The method 500 can end.

Figure 6:
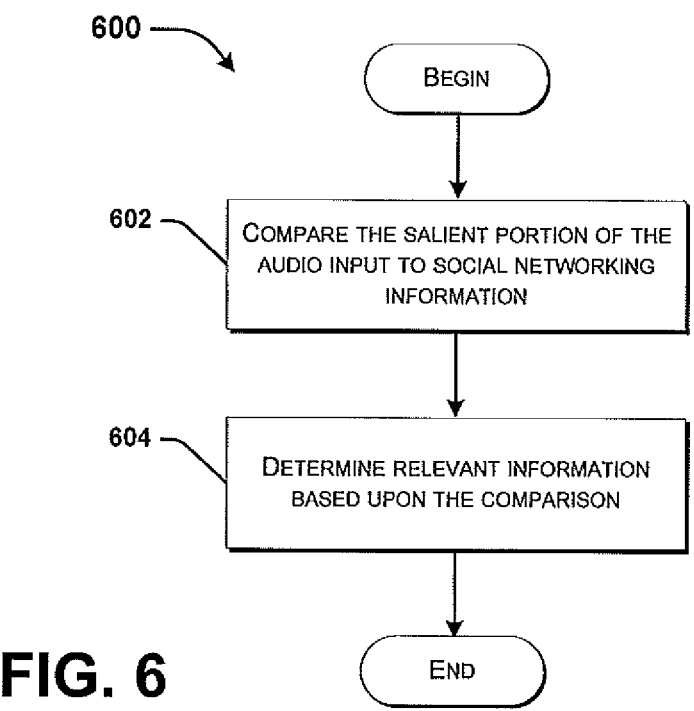
FIG. 6 illustrates a method for determining relevant information for a social interaction, according to one embodiment disclosed herein.

Referring to FIG. 6, a method 600 for determining relevant information for a social interaction, according to one embodiment. The method 600 begins and flow is to block 602, whereat the first MD 106 compares the salient portion of the audio input as determined, for example, by one of the methods 400, 500 described above, to social network information that is stored in the data store(s) 118 and is associated with the second user 120 as identified, for example, by the identifier received in the method 300. At block 604, the first MD 106, based upon the comparison, determines relevant information of the social networking information for presenting to the first user 104 via a display and/or audio output of the first MD 106. The method 600 can end.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method comprising:
   receiving, by a first mobile device, an audio input of an in-person conversation between a first user and a second user;
   identifying, through the audio input, an identity of the second user associated with a second mobile device;
   determining, by the first mobile device, a salient portion of the audio input;
   receiving, from a system, relevant information associated with the identity of the second user based on the salient portion of the audio input; and
   initiating, at the first mobile device, a presentation of the relevant information;
   wherein receiving the audio input by the first mobile device comprises at least one function selected from a group consisting of:
      receiving, via a microphone of the first mobile device, the audio input from the second user, the second user being engaged in a vocal in-person conversation with the first user associated with the first mobile device; and
      receiving, via a transceiver of the first mobile device, an audio file comprising the audio input, the audio input being associated with the second user and the second user being engaged in the vocal in-person conversation with the first user associated with the first mobile device.

2. The method of claim 1, wherein determining the salient portion of the audio input comprises one of:
converting at least a portion of the audio input into text and identifying at least one keyword from the text, the at least one keyword being the salient portion; and
analyzing at least a portion of the audio input and identifying at least one keyword from the audio input, the at least one keyword being the salient portion.

3. The method of claim 1, wherein the relevant information being social-networking information received from a data store associated with a social network.

4. The method of claim 3, wherein the social-networking information comprises at least one of a name, a physical address, a telephone number, an email address, a chat client handle, a user name, an avatar, a profile, a profile picture, a post by the individual, a topic of interest to the individual, and a specific detail about a topic of interest to the second user.

5. The method of claim 1, wherein initiating the presentation of the relevant information comprises presenting the relevant information via at least one of a display and an audio output of the first mobile device, the audio output comprising at least one of a speaker, an audio output jack to which a wired audio output device is connected, and a wireless audio output component to which a wireless audio output device is connected.

6. A mobile device comprising:
a processor;
a memory operatively coupled to the processor, the memory comprising instructions that, when executed by the processor, cause the processor to perform operations comprising:
receiving an audio input of an in-person conversation between a first user and a second user;
identifying, through the audio input, an identity of the second user associated with a second mobile device;
determining a salient portion of the audio input;
comparing the salient portion of the audio input to social-networking information associated with the identity of the second user to determine relevant information associated with the second user; and
presenting the relevant information via at least one of a display of the mobile device and an audio output component of the mobile device;
wherein receiving the audio input comprises at least one function selected from a group consisting of:
receiving, via a microphone of the mobile device, the audio input from the second user, the second user being engaged in a vocal in-person conversation with the first user associated with the mobile device; and
receiving, via a transceiver of the mobile device, an audio file comprising the audio input, the audio input being associated with the second user and the second user being engaged in a vocal in-person conversation with the first user associated with the mobile device.

7. The mobile device of claim 6, wherein the audio output comprises at least one of a speaker, an audio output jack to which a wired audio output device is connected, and a wireless audio output component to which a wireless audio output device is connected.

8. The mobile device of claim 6, wherein the operations further comprise receiving an identifier identifying the second user associated with the second mobile device.

9. The mobile device of claim 6, wherein the operation of determining the salient portion of the audio input further comprises at least one of:
converting at least a portion of the audio input into text and identify at least one keyword from the text, the at least one keyword being the salient portion; and
analyzing at least a portion of the audio input and identify at least one keyword from the audio input, the at least one keyword being the salient portion.

10. The mobile device of claim 6, wherein the social-networking information being retrieved from a data store associated with a social network.

11. The mobile device of claim 10, wherein the social-networking information comprises least one of a name, a physical address, a telephone number, an email address, a chat client handle, a user name, an avatar, a profile, a profile picture, a post by the individual, a topic of interest to the individual, and a specific detail about a topic of interest to the second user.

12. The mobile device of claim 6, wherein the operation of presentation of the relevant information comprises initiating presentation of the relevant information via at least one of the display and the audio output.

13. A computer-readable storage device comprising computer-executable instructions that, when executed by a processor, cause the processor to perform operations comprising:
receiving, by a first mobile device, an audio input of an in-person conversation between a first user and a second user;
identifying, through the audio input, an identity of the second user associated with a second mobile device;
determining a salient portion of the audio input;
comparing the salient portion of the audio input to social-networking information associated with the identity of the second user to determine relevant information associated with the of the second user; and
initiating a presentation of presenting the relevant information via the first mobile device;
wherein receiving the audio input comprises at least one function selected from a group consisting of:
receiving, via a microphone of the first mobile device, the audio input from the second user, the second user being engaged in a vocal in-person conversation with the first user of the first mobile device; and
receiving, via a transceiver of the first mobile device, an audio file comprising the audio input, the audio input being associated with the second user and the second user being engaged in a vocal in-person conversation with the first user of the first mobile device.

14. The computer-readable storage device of claim 13, wherein the operation of determining the salient portion of the audio input further comprises one of:
converting at least a portion of the audio input into text and identify at least one keyword from the text, the at least one keyword being the salient portion; and
analyzing at least a portion of the audio input and identify at least one keyword from the audio input, the at least one keyword being the salient portion.

15. The computer-readable storage device of claim 13, wherein the social-networking information comprises at least one of a name, a physical address, a telephone number, an email address, a chat client handle, a user name, an avatar, a profile, a profile picture, a post by the individual, a topic of interest to the individual, and a specific detail about a topic of interest to the second user.

* * * * *